United States Patent
Baumann et al.

[15] 3,691,204
[45] Sept. 12, 1972

[54] SULFODIBENZOFURAN SULFONES

[72] Inventors: Hans-Peter Baumann, Munchenstein; Robert-Christian Keller, Basel, both of Switzerland

[73] Assignee: Sandoz Ltd., Basel, Switzerland

[22] Filed: June 29, 1970

[21] Appl. No.: 60,170

Related U.S. Application Data

[62] Division of Ser. No. 620,231, March 3, 1967, Pat. No. 3,538,151.

[30] Foreign Application Priority Data

March 11, 1966 Switzerland...............3577/66

[52] U.S. Cl. .........................................260/346.2 M
[51] Int. Cl. ...............................................C07d 5/44
[58] Field of Search ...............................260/346.2 M

[56] References Cited

UNITED STATES PATENTS

2,081,876  5/1937  Prahl..........................260/515

*Primary Examiner*—Alex Mazel
*Assistant Examiner*—Bernard Dentz
*Attorney*—Wenderoth, Lind & Ponack

[57] ABSTRACT

Levelling agents for dyeing anionic dyestuffs are constituted by diphenylene oxide sulphones, hydroxydiphenylene oxide sulphones, diphenyl oxide sulphones, diphenyl sulphide sulphones, mixtures of these with sulphonated aromatic hydrocarbon oils, their alkali metal and ammonium salts and/or condensation products, and reaction products of these sulphones with formaldehyde or dimethylol urea; an example of dyeing with such a levelling agent is also given. The use of these levelling agents avoids stripy or ring appearance of certain nylon yarns, especially when these are mixed with spandex type fibers.

2 Claims, No Drawings

SULFODIBENZOFURAN SULFONES

This application is a divisional application of Application Ser. No. 620,231, filed Mar. 3, 1967, now U. S. Pat. No. 3,538,151.

BACKGROUND OF THE INVENTION

Polyamide fibers can be dyed with anionic dyestuffs, but frequently the resulting dyed goods have a stripy or ringy appearance due to an uneven adsorption and distribution of dye. Furthermore, mixtures of polyamide fibers and elastomeric polyurethane fibers or yarns as are used for making woven or knitted fabrics cannot easily be level dyed in equal color shades with anionic dyestuffs as these are preferentially adsorbed on the polyamide fibers thus leaving the polyurethane fibers in a much paler shade and causing the fabrics to be stripy.

It has previously been proposed to use certain levelling agents to minimize the above difficulties, but these previously proposed levelling agents have not been entirely satisfactory for one or more of the following reasons: insufficient penetration power, necessity to effect a relatively troublesome separate treatment before dyeing, relatively high price of the levelling agent, and difficulties in handling these due to their being non-solids at ambient temperature.

We have now found that the use of certain novel levelling agents described hereinafter and which have an excellent penetration power enables one to dispense with a separate pretreatment before dyeing and to use relatively inexpensive products which, moreover, can be handled very easily because they are obtainable in the solid state at room temperature.

SUMMARY OF THE INVENTION

The present invention provides sulphones of the formula

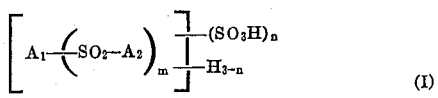

(I)

wherein $m$ represents 1 or 2,
$n$ represents 1, 2 or 3,
$A_1$ and $A_2$ are identical with or different from one another and each represents the radical of a compound of the formula

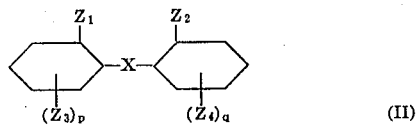

(II)

wherein X represents —O— or —S—,
each of $Z_1$ and $Z_2$ represents a hydrogen atom or $Z_1$ together with $Z_2$ represents a single bond,
and each of $Z_3$ and $Z_4$ represents hydrogen, halogen, lower alkyl or alkoxy, hydroxy, carboxy or optionally substituted phenyl,
and each of $p$ and $q$ represents 1 or 2,
and their water soluble salts and quaternary onium compounds, and reaction products thereof resulting by after-sulphonation, treatment with formaldehyde or a methylol radical containing connecting agent, and the neutralized products resulting by neutralizing said reaction products with a base or an acid.

The present invention also provides a process for the production of the above sulphones (1), which is characterized in that a compound of the formula (II) or a mixture of two or more such compounds is treated with a sulphonating agent until the resulting condensation product contains at least one sulphur atom in the form of a sulphonyl radical and at least one in the form of a sulphonic acid radical.

DESCRIPTION OF PREFERRED EMBODIMENTS

Suitable compounds of the formula (II) are, for example, phenoxybenzene, phenyl thiobenzene and their derivatives containing one to four substituents, for instance halogen atoms (e.g. chlorine atoms), lower alkyl or alkoxy radicals (e.g. methyl, ethyl, methoxy, ethoxy) or hydroxy or carboxy radicals; further examples of compounds of formula (II) are 4- or 3-phenoxy-diphenyl, dibenzofuran and 3-hydroxy-dibenzofuran.

Compounds of the formula (II) may be used individually or in admixture with one another. However, it is likewise possible to use a mixture consisting of one or more compounds of the formula (II) and one or more aromatic hydrocarbons which may optionally be substituted with one or more halogen atoms, alkoxy or hydroxy radicals, providing that the mixture has a content of one or more compounds of formula (II) of at least 30 percent, preferably over 50 percent, e.g. about 70 percent. Examples of aromatic hydrocarbons which may optionally be substituted with one or more halogen atoms, alkoxy or hydroxy radicals are: benzene and its derivatives, e.g. methylbenzene, dimethylbenzene, ethylbenzene, isopropylbenzene, chlorobenzene, methoxybenzene, hydroxybenzene, hydroxymethylbenzene, hydroxychlorobenzene, diphenyl and its derivatives, e.g. 2- or 4-hydroxydiphenyl, and naphthalene and its derivatives, e.g. 1- or 2-hydroxynaphthalene.

Examples of suitable sulphonation agents are: 90 to 100 percent sulphuric acid, 0 to 65 percent oleum, chlorosulphonic acid, amidosulphonic acid, sulphur trioxide or sulphuryl chloride or mixtures of e.g., 100 percent sulphuric acid and chlorosulphonic acid.

The sulphonation agent is advantageously used in an amount of from one to two mol, preferably 1.2 to 1.7 mols, (calculated as 100 percent sulphuric acid) for every mol of the compound of formula (II). Evidently it is possible to use greater quantities of the sulphonating agent, e.g. up to about 10 mols per mol of compound of formula (II), as is the case in producing benzene or naphthalene polysulphonic acids or dyestuff sulphonic acids (Fierz-David and Blangey, "Grundlegende Operationen der Farbenchemie" (1943) pages 138; 201 or 301); however, this use of large amounts of sulphonating agent is designed to lead to a minimum of sulphone formation and therefore offers no advantage for the production of compounds of formula (I).

It is possible to effect the reaction in one stage, e.g. in a single tub, or in two or even three stages: the reaction, e.g., may be started at room temperature and completed at about 200° C. It is advantageous to effect first a sulphonation with 90 to 100 percent sulphuric acid, with 0 to 65 percent oleum, with chlorosulphonic acid or with sulphur trioxide at an initial temperature of 20° C, then rising to 150° C, and then to condense the resulting mono- or polysulphonic acid at a temperature of from 150° to 220° C., optionally in the presence of a condensation agent (e.g. $SO_2Cl_2$, $30Cl_2$, $PCl_3$ or $ZnCl_2$), the condensation being either intercondensation or with a further compound of formula (II) or with an aromatic hydrocarbon optionally substituted with alkoxy or hydroxy groups. Suitable the condensation is effected in such a way that the entire sulphonation mass or the sulphonic acid, after isolating it from the sulphonation agent and preferably drying, or its ammonium salt, if desired with the addition of a further compound of formula (II) or an aromatic hydrocarbon which may optionally be substituted with halogen, alkoxy or hydroxy groups, is heated to temperatures of from 150° to 190° C at atmospheric pressure or preferably at reduced pressure. As the condensation results in the production of 1 mol of water per mol of sulphonic acid radical (which is converted to a sulphonyl radical) and this water may have undesirable side effects, it should be removed from the reaction mixture at once after it has been formed. In order to speed up to the utmost this removal of water, the pressure is suitably reduced, e.g. to below 20 mm.of Hg. This may be effected by continuously or stepwise reducing the pressure to a final value of 10 to 20 mm of Hg (water pump) or 1 to 20 mm of Hg, preferably 1 to 10 mm. of Hg, (vacuum pump). It is evidently possible to effect the condensation at a pressure which is more than 20 mm of Hg, e.g. 30, 50 or 100 mm. of Hg, but in this case the reaction takes longer unless a correspondingly higher working temperature is used. Instead of reducing the pressure it is likewise possible to introduce over or in the condensation mass a dry and inert gas stream (e.g. nitrogen or carbon dioxide), as so to remove the water in the form of water vapor, or to carry out the condensation in an inert organic medium acting as an entrainment agent, e.g. dichlorobenzene, nitrobenzene, chloronaphthalene, or to use an entrainment agent and work simultaneously at a reduced pressure.

The duration of the sulphonation depends on the specific compound of the formula (II) used, the sulphonation agent used, the desired degree of sulphonation and the sulphonation temperature and amount to, e.g., 1–4 hours at 100° C. using 1.5 mols of 100 percent sulphuric acid per mol of diphenyl oxide. By testing the solubility in water alone or in the presence of an acid binding agent it is possible to follow easily the course of the sulphonation.

The duration of the condensation likewise depends on many factors, e.g. the temperature, the pressure and the degree of condensation. As a control test it is possible to measure the amount of water split off or the total acid content of a sample of condensation mass, the difference between the acid content at the beginning and that at the end of the condensation being a measure of how far the reaction has proceeded.

When the condensation products are insufficiently water soluble or have an unsuitable affinity for fibers, it is possible to after-sulphonate them to impart to them the required solubility in water or affinity to fibers when they are used, e.g., as dyeing auxiliaries. For this purpose there may be suitably used as the sulphonation agent concentrated sulphuric acid, oleum or chlorosulphonic acid and working is effected under the conditions mentioned for the sulphonation, if necessary in the presence of an organic solvent. The condensation products may be after treated with formaldehyde or a methylol radical containing connecting agent, e.g. dimethylol ures, polymethylol melamine, preferably using alkaline or acid conditions.

In the resulting sulphenes of the formula (I) the free sulphonic acid radicals may be neutralized with an ammonia solution and the resulting solutions, if desired after filtering to clearness, may be evaporated to dryness or dried in a jet drier or used as such.

Instead of the ammonia solution is it possible to neutralize with a sodium, potassium, or lithium hydroxide solution, a sodium or potassium carbonate solution or, alternatively, the solid carbonates or bicarbonates of sodium, potassium or lithium. Further suitable neutralizing agents are magnesium oxide or carbonate, calcium oxide, hydroxide or carbonate, further solutions of water soluble amines, e.g. methylamine, dimethylamine, trimethylamine, ethylamine, ethanolamine, diethanolamine, triethanolamine, as well as the corresponding propanolamines and hexamethylenetetramine.

The condensation products resulting by treatment with formaldehyde or with a methylol radical containing connecting agent in alkaline medium may be neutralized with sulphuric acid or another acid, e.g. hydrochloric, acetic, formic or also phosphoric acid or with an organic sulphonic acid (methane, benzene or 4-methylbenzene sulphonic acid), while in the case of treatment in acid medium with formaldehyde or with methylol radicals containing connecting agents there may be used the above bases.

The sulphones of formula (I) and their above derivatives are very suitable as textile auxiliaries, especially for level dyeing polyamide fibers showing stripes or rings on normal dyeing with anionic dyestuffs, as they are able to regulate the absorption rate and the dye distribution of anionic dyestuffs in fibers to be dyed. However, they can likewise by used very successfully for dyeing in a uniform shade mixtures of synthetic polyamide fibers and elastomeric fibers on a basis of polyurethanes which are polycondensation products of diols and di-isocyanates, e.g. of 1,4-butanediol and 1,6-hexamethyl-enediisocyanate, or mixed condensation products of polyethers or polyesters with diisocyanates and diamines or hydrazine [Ullmann 'Enzyklopadie der technischen Chemie', 14, 338–363, especially 351–2 (1963)].

The term "anionic dyestuffs" designates dyestuffs which are capable of forming colored anions in aqueous dye liquors, for example acid level dyestuffs, milling dyestuffs, 1:1- and 1:2 metal complex dyestuffs, chrome dyes, direct dyes and reactive dyes.

The conditions under which dyeing is effected are essentially those usual for the specific anionic dyestuff used e.g. temperatures of from 80° to 140° C, preferably 95° to 130° C, an elevated pressure being used when the dyeing temperature exceeds 100° C.; liquor ratios of 1:5 up to 1:200, preferably from 1:10 up to 1:100; pH values of from 2 to 8 depending on the dyeing properties of the dyestuff used when the treatment of the fibers with the sulphone of the present invention is carried out in the dye bath itself.

However, treatment with the sulphone of the present invention likewise be effected before the actual dyeing and this at temperatures of about 20° C, to 100° C, preferably at 50° to 100° C, under weakly acid conditions, e.g. in an acetic acid medium. The fibers treated in this way may be removed from the liquor, rinsed with water, optionally dried and then brought into a freshly prepared dye bath and dyed therein, or dyed directly in the treatment bath after adding thereto a dyestuff and optionally one or more dyeing assistants, for example salts, acids, metallizing agent and surface active agents.

The quantity of sulphone of the invention used will depend, inter alia, on the nature of the fibers to be dyed, the amount and structure of the dyestuff used for dyeing, the pH value of the dye bath, the dyeing temperature and the duration of the operation. This amount may vary between 0.02 to 20 percent by weight, preferably 0.1 to 15 percent by weight, based on the material to be dyed. In addition to the sulphone of the present invention, there may be added to the dye baths buffer substances, e.g. hexamethylenetetramine, disodiumphosphate, tetrasodiumpyrophosphate, urea or ammonium rhodanide. Optionally there may be added to the liquor, in addition to sulphone and dyestuff, one or more non-ionic, anionic or cationic, capillary active compounds, providing they do not produce precipitate with the dyestuff and the sulphone.

The sulphones of formula (I) possess the great advantage that they practically do not foam as do the known sulphonated diphenyl oxides which contain a long aliphatic chain; furthermore, they are very good dispersing agents in acid or neutral medium and also, in contrast to e.g. sodium dinaphthylmethanedisulphonate, in alkaline medium.

The dyeings which can be obtained in accordance with the Dyeing Examples given hereinafter are level and of uniform shade, and otherwise possess the good properties which are peculiar to the anionic dyestuffs used.

In the following Examples parts and percentages are by weight and the temperatures are stated in degrees Centigrade. In the structural formulae Ph is the phenyl or phenylene radical respectively, $n$ is 1, 2 or 3, and $m$ is 1 or 2.

EXAMPLE 1

168 parts of diphenylene oxide (i.e. dibenzofuran) (1 mol) together with 147 parts of 100 percent sulphuric acid (1.5 mols) are heated for four hours to 100° C. The temperature is subsequently increased during two hours to 140° C and condensing is first effected for two hours at 140° C at a pressure of 13 mm of Hg and then for a further three hours at 160° C at a pressure of 3 mm of Hg. The resulting product has an acid content of 455 mval/100g of product (titrated against Congo red). While the melt is still hot it is removed from the reaction vessel and allowed to cool, whereby a solid cake results on solidification. The resulting light brown product may be pulverized and stored as such or stirred with an equal quantity of water, the resulting mass neutralized with 30 percent sodium hydroxide solution and evaporated to dryness.

Instead of using a sodium hydroxide solution it is likewise possible to use the corresponding amount of ammonium hydroxide solution.

The light brown powdered sulphone has the following formula:

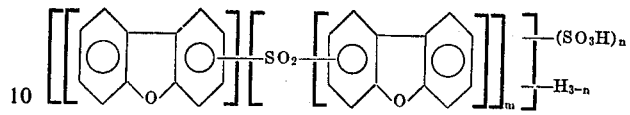

EXAMPLE 2

184 parts of 3-hydroxy-diphenylene oxide of the formula

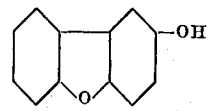

are used and working is first effected as described in Example 1. The melt is then kept at 180° C at a pressure of 3 mm of Hg until the acid content amounts to 350 mval/100 g. (titrated against Congo red). Working up is effected in the manner described in Example 1.

The resulting product has the following formula:

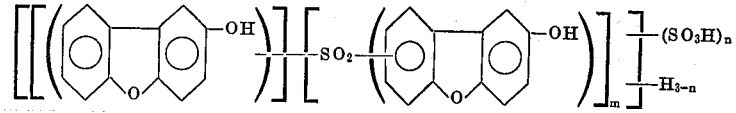

EXAMPLE 3

147 parts of 100 percent sulphuric acid are slowly added to 170 parts of diphenyl oxide and heated for four hours to 100° C. Subsequently the pressure is reduced to 20 mm of Hg and the temperature is raised during two hours to 160° C. At this temperature condensation is effected for four hours. The pressure is then reduced further to 3 mm of Hg and condensation is continued until a sample of the condensate has an acid content of 374 mval,/100 g. of resin (titrated against Congo red). The hot melt is removed from the reaction vessel and allowed to solidify.

The resulting light brown product can be pulverized and stored as such or it is mixed with the same weight of water, neutralized with concentrated ammonia solution and the solution is adjusted to a 40 percent content of active substance (calculated as ammonium salt).

The light brown powdered product has the following formula:

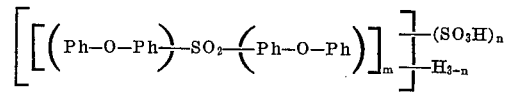

EXAMPLE 4

246 parts of a yellow brown oil having a neutral reaction and containing phenoxy-diphenyl as the main constituent (the physical properties of this oil are density: 1.139, solidification point: 0° C. boiling point: 270–350°C) together with 148 parts of 100 percent sulphuric acid are heated for four hours to 100° C. Subsequently the pressure is reduced to 17 mm. of Hg and the temperature is increased to 140° C during two hours. The pressure is then further lowered to 2 mm. of Hg and the temperature increased to 150° C. Condensation is then effected until a sample of the condensate has an acid content of 350 mval./100 g. of resin (titrated against Congo red). The resulting sulphone is worked up in the manner described in Example 3. It can likewise be isolated in the form of the sodium salt as described in Example 1. It has equally good properties as the product of Example 3.

The sulphone has the following formula:

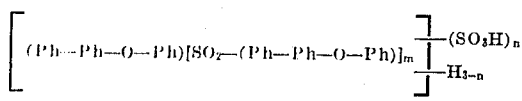

EXAMPLE 5

Working is effected in the manner described in Example 3, but using 127.5 parts of diphenyl oxide and 70.5 parts of hydroxybenzene and the condensation is effected at 160° C and 3 mm of Hg until the acid content has fallen to 355 mval/100 g. of product (titrated against Congo red).

The resulting product is a mixture of sulphones having the following formulas:

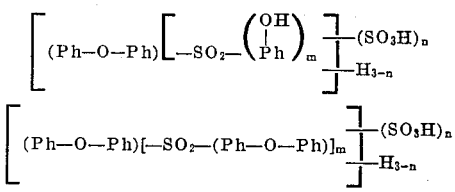

and

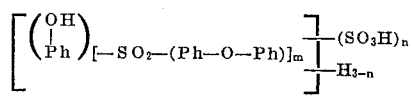

By replacing the hydroxybenzene with the equivalent amount of 2-, 3- or 4-methyl-1-hydroxybenzene or a technical mixture thereof, methyl- or dimethylbenzene, methoxy- or ethoxybenzene, naphthalene, 1- or 2-hydroxynaphthalene similar products are obtained.

Sulphones with similar properties are also produced by using 170 parts of diphenyl oxide and 47 parts of hydroxybenzene or the equivalent amount of, e.g., a methyl-hydroxybenzene mixture, xylene or naphthalene.

Further sulphones of formula (I) are produced in the same manner using corresponding compounds of the formula (II):

Compound of formula (II)   Acid content
a. diphenyl sulphide (186 parts)   375 mval/100 g
b. mixture of 119 parts of diphenyl oxide and 74 parts of the oil used in Example 4   360 mval/100 g The compound (a) above has the following formula:

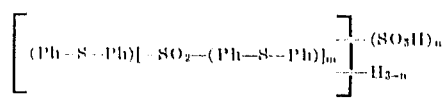

EXAMPLE 6

117 parts (1.2 mols) of 100 percent sulphuric acid are slowly added to 166 parts (1 mol) of a mixture of 26.5 percent diphenyl and 73.5 percent diphenyl oxide. The mixture is first heated to 100° C for four hours, the pressure reduced to 17 mm. of Hg and the temperature increased to 160° C during two hours. Condensation at this temperature is effected for four hours, the pressure is reduced to 3 mm. of Hg and the reaction temperature is increased to 180° C. Condensation is then effected until a sample of the condensate has an acid content of 348 mval/100 g (titrated against Congo red).

The sulphone is worked up in the manner described in Example 1 and is a mixture corresponding to the following formulae:

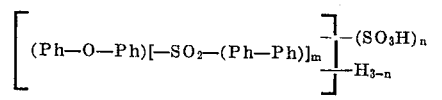

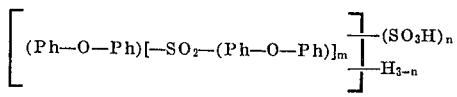

and

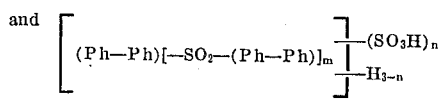

EXAMPLE 7

170 parts (1 mol) of diphenyl oxide are placed into 245 (2.5 mols) of 100 percent sulphuric acid and heated to 130° C for two hours. The acid content of a sample then amounts to 755 mval/100 g (titrated against Congo red). The pressure is then lowered to 11 mm of Hg and the resulting water is removed; the acid content then rises to 770 mval/100 g. The pressure is again allowed to rise to 760 mm of Hg and 340 parts (2 mols) of diphenyl oxide are added at 130° C and the mixture is heated to 210° C; this is first kept for two hours at 210° C and 760 mm of Hg and then for a further five hours at 210° C and a pressure of 7 mm of Hg, whereby a little unreacted diphenyl oxide distill distills off. The resulting sulphone has an acid content of 170 mval/100 g (titrated against Congo rod) and is worked up in the manner described in Example 1.

EXAMPLE 8

170 parts (1 mol) of diphenyl oxide are dissolved in 100 parts of acetic acid anhydride at room temperature. 98 parts of 100 percent sulphuric acid are added dropwise to this solution during about 20 minutes and the temperature is allowed to rise to 95°–100°, whereby the solution becomes progressively darker. Further heating to 110° C is then effected for 1 hour and the sulphonation mixture is poured into 750 parts of ice water. A small amount of undissolved material is filtered off and the initially oily filtrate is subjected to water vapor distillation to remove excess diphenyl oxide. The aqueous solution is then evaporated at a reduced pressure. The resulting residue, having an acid content of 535 mval/100g, is heated to 160° C at a pressure of 6 mm. of Hg until the acid content is 355 mval/100 g. and working up as in Example 3 is effected.

EXAMPLE 9

174.5 parts (1.5 mols) of chlorosulphonic acid are added dropwise, while cooling well and stirring, to 170 parts (1 mol) of diphenyl oxide during several hours, so that the temperature amounts to about 30° C. The sulphonation takes place with strong hydrogen chloride evolution. The mixture is then heated for 2½ hours to 130°–140° C. the acid content amounting to 490 mval/100 g, then for several hours to 160° C at a pressure of 5 mm. of Hg, the acid content thereby falling to 390 mval/100 g (titrated against Congo red).

The resulting condensation product dissolves in water to give a clear solution; it is worked up in accordance with the details of Example 1.

When the chlorosulphonic acid is replaced with 177 parts (1.9 mols calculated as 100 percent sulphuric acid) of oleum with about 27% $SO_3$ and working is otherwise effected as described above, a similar water soluble product results of which the acid content during the condensation at reduce pressure falls from 590 mval/100 g to 540 mval/100 g.

EXAMPLE 10

50 parts of acid resin produced according to Example 3 are mixed with 36 parts of 30 percent sodium hydroxide solution and condensed with 4.5 parts of dimethylol urea at temperatures of 50°–60° C for about six hours until a sample of the condensate is water soluble. The excess of sodium hydroxide is then neutralized with dilute sulphuric acid and the entire material is evaporated to dryness. A light brown water soluble powder results.

EXAMPLE 11

50 parts of acid resin produced according to Example 3 are made alkaline with 34 parts of 30 percent sodium hydroxide solution, 11 parts of 37 percent formaldehyde solution are added and condensation at temperatures between 95° and 105° C is effected until formaldehyde odor is no longer detectable. The sodium hydroxide excess is neutralized with dilute sulphuric acid and all the material is evaporated to dryness. A light brown water soluble powder results.

The products of Examples 7, 8 and 9 have a formula corresponding to that of Example 3.

DYEING EXAMPLE (A)

Yarns consisting of 50 parts of nylon 6.6 and 50 parts of a spandex fiber "Lycra" (Ullman 14 351 (1963)) are dyed in 4000 parts of a dye liquor containing the following additives:

0.25 parts of sodium-1-amino-2-bromo-4-(4'-methylphenylamino)-anthraquinone-2'-sulphonate 2 parts of 80 percent acetic acid and 2 parts of sulphone described in Example 1 (in the form of the sodium salt).

The yarns are placed into the dye bath at 35° C and heated during 40 minutes to 95° C. Dyeing at this temperature is effected for one hour. Both yarns are dyed level and with equal tint in a blue color. A similar result is obtained by using the sulphone of Example 6 instead of that of Example 1.

DYEING EXAMPLE (B).

100 parts of a nylon 6.6 material which tends to become stripy on dyeing without special treatment, are dyed in 4000 parts of a dye bath liquor containing 0.3 parts of sodium -1-amino-4-(4'-acetylaminophenylamino)-anthra-quinone-2-sulphonate, 4 parts of 85 percent formic acid and 2.5 parts of the solution of ammonium salt described in Example 3.

The material is put into the dye bath at 50° C, this is heated during 45 minutes to 98° C and kept for one hour at 98°–100° C. The dyed material is removed from the bath, rinsed with water and dried. A greenish blue dyeing results which is level and free of stripes.

Although the present invention is described herein with particular reference to specific details, it is not intended that such details shall be regarded as limitations upon the scope of the invention except insofar as included in the accompanying claims.

We claim:

1. A member selected from the group consisting of a sulfone of the formula

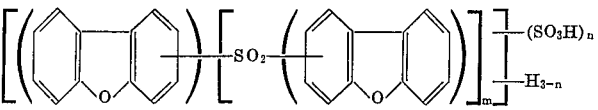

wherein $m$ is 1 or 2 and $n$ is 1, 2 or 3, a water soluble salt thereof, and a quaternary onium compound thereof.

2. A member selected from the group consisting of a sulfone of the formula

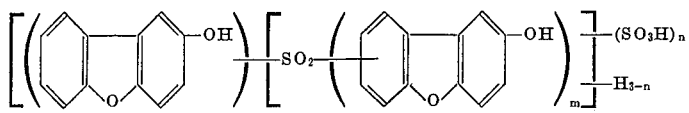

wherein $m$ is 1 or 2, and $n$ is 1, 2 or 3, a water soluble salt thereof, and a quaternary onium compound thereof.

* * * * *